(12) United States Patent
Katagiri et al.

(10) Patent No.: US 7,640,132 B2
(45) Date of Patent: Dec. 29, 2009

(54) RECORDING MEDIUM AND TEST APPARATUS

(75) Inventors: Tetsu Katagiri, Tokyo (JP); Takehisa Suzuki, Tokyo (JP)

(73) Assignee: Advantest Corporation, Tokyo (JP)

( * ) Notice: Subject to any disclaimer, the term of this patent is extended or adjusted under 35 U.S.C. 154(b) by 58 days.

(21) Appl. No.: 11/738,521

(22) Filed: Apr. 23, 2007

(65) Prior Publication Data

US 2008/0262778 A1 Oct. 23, 2008

(51) Int. Cl.
*G06F 11/263* (2006.01)
*G06F 11/26* (2006.01)

(52) U.S. Cl. .............. 702/123; 702/118; 702/119; 702/108; 714/738; 714/742

(58) Field of Classification Search ............ 702/123, 702/108, 117, 118–120
See application file for complete search history.

(56) References Cited

U.S. PATENT DOCUMENTS

| 7,158,908 | B2* | 1/2007 | Iwamoto | 702/117 |
| 7,184,917 | B2* | 2/2007 | Pramanick et al. | 702/120 |
| 7,437,261 | B2* | 10/2008 | Pramanick et al. | 702/117 |
| 2005/0154550 | A1* | 7/2005 | Singh et al. | 702/108 |
| 2005/0261855 | A1* | 11/2005 | Adachi et al. | 702/108 |

\* cited by examiner

*Primary Examiner*—Hal D Wachsman
(74) *Attorney, Agent, or Firm*—Osha • Liang LLP

(57) ABSTRACT

A recording medium recording thereon a program for a test apparatus including test modules that test devices under test is provided. The program includes: a common function provision program which is executed on a controller for controlling the test apparatus and provides a function common to each type of the test modules; and a plug-in processing program which is executed on the controller and plugs-in an individual function provision program for providing a function appropriate for the type of each of the test modules.

16 Claims, 15 Drawing Sheets

RECORDING MEDIUM AND TEST APPARATUS

BACKGROUND

1. Technical Field

The present invention relates to a recording medium, a test apparatus and a program. Particularly, the present invention relates to a recording medium recording thereon a program for a test apparatus including test modules that test device under tests, a test apparatus that tests devices under test and a program.

2. Related Art

Generally, a test apparatus that tests a DUT (device under test) has been known. The test apparatus includes test modules, a test head including thereon the test modules and a system controller.

A test module generates a test signal in accordance with a test pattern and outputs the generated test signal to a DUT. In addition, the test module captures an output signal outputted from the DUT in accordance with the test signal and compares the captured output signal with an expected value. Then, the test module determines whether the DUT passes/fails based on the comparison result.

The system controller executes an operation program and provides to the user a graphical user interface (GUI) to set the test pattern and the expected value and so forth, to test modules for example. Then, the system controller sets the test pattern and the expected value and so forth for each test module included in the test head in accordance with the input by the user.

The test apparatus may include thereon test modules provided by any person (third party vendor) other than the manufacturer of the test apparatus. In this case, the test apparatus executes the operation program provided by the third party vendor, and provides to the user the GUI for the setup unique to the third party vendor which causes the user to set the test pattern and the expected value and so forth to the test modules.

However, when the operation programs of the various vendors different from each other are provided to the user, the user should have to selectively use each program, so that the user work has been increased.

SUMMARY

Accordingly, it is an advantage of the invention to provide a recording medium, a test apparatus and a program which solve the above-mentioned problem. This advantage may be achieved through the combination of features described in independent claims of the invention. Dependent claims thereof specify preferable embodiments of the invention.

Thus, a first aspect of the present invention provides a recording medium recording thereon a program for a test apparatus including test modules that test devices under test. The program includes: a common function provision program which is executed on a controller for controlling the test apparatus and provides a function common to each type of the test modules; and a plug-in processing program which is executed on the controller and plugs-in an individual function provision program for providing a function appropriate for the type of each of the test modules.

The second aspect of the present invention provides a test apparatus that tests devices under test. The test apparatus includes: a controller that controls the test apparatus; and a plurality of slots into which each test module selected among various test modules that test the devices under test by a user can be mounted. In executing a program which causes a user to operate the test apparatus, the controller performs: to execute a common function provision program included in the program to provide a function common to each type of the test modules; to execute a plug-in processing program included in the program to plug in the program an individual function provision program which provides a function appropriate for the type of each of the test module; and to execute the individual function provision program in response to that the individual function provision program is called from the program to provide a function appropriate for the test module corresponding to the individual function provision program.

The second aspect of the present invention provides a program for a test apparatus including test modules that test devices under test. The program includes: a common function provision program which is executed on a controller for controlling the test apparatus and provides a function common to each type of the test modules; and a plug-in processing program which is executed on the controller and plugs-in an individual function provision program for providing a function appropriate for the type of each of the test modules.

It is noted that the summary of the invention described above does not necessarily describe all necessary features of the invention. The invention may also be a sub-combination of the features described above.

BRIEF DESCRIPTION OF DRAWINGS

Brief Description of the Drawings

Figure 1:
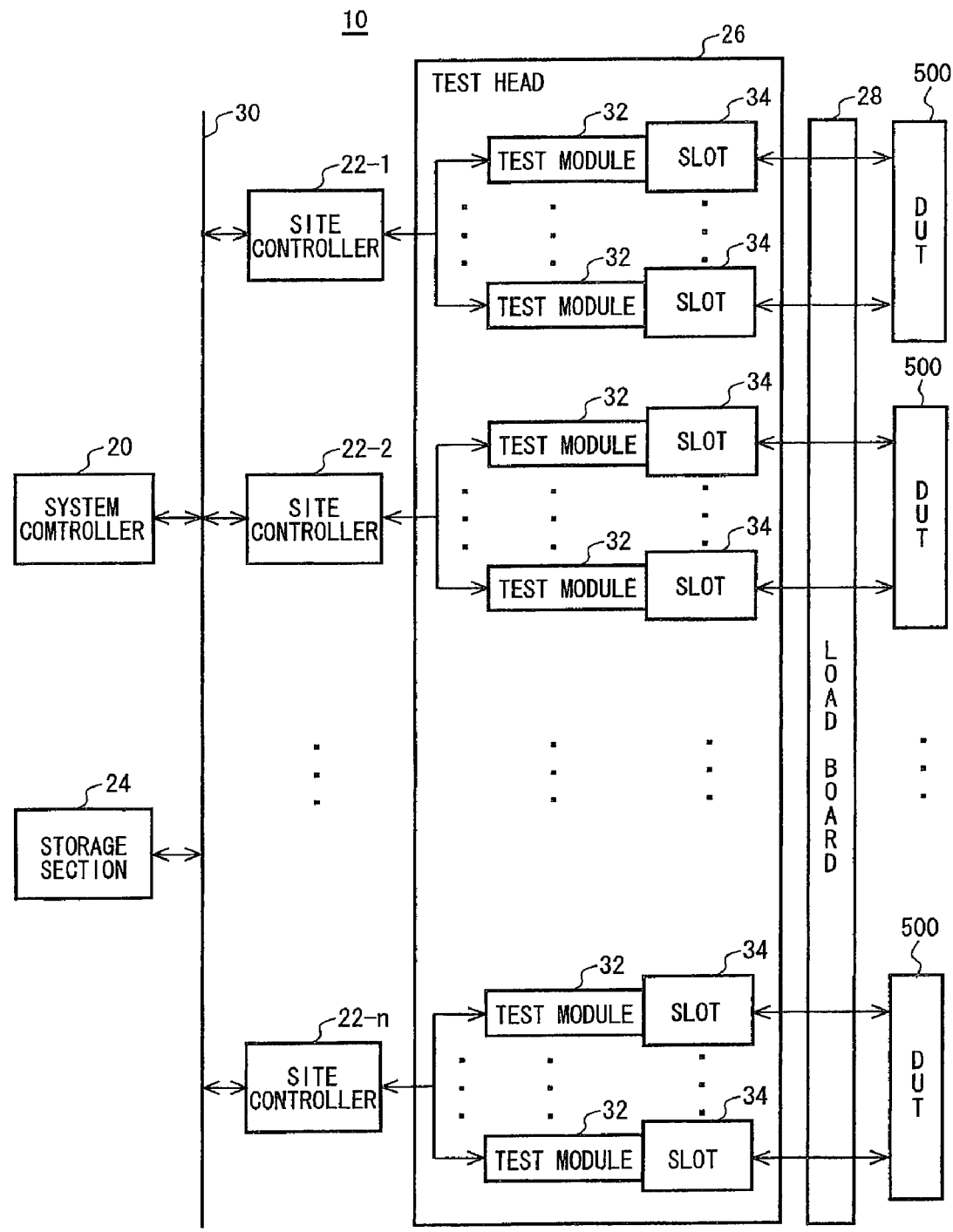
Figure 2:
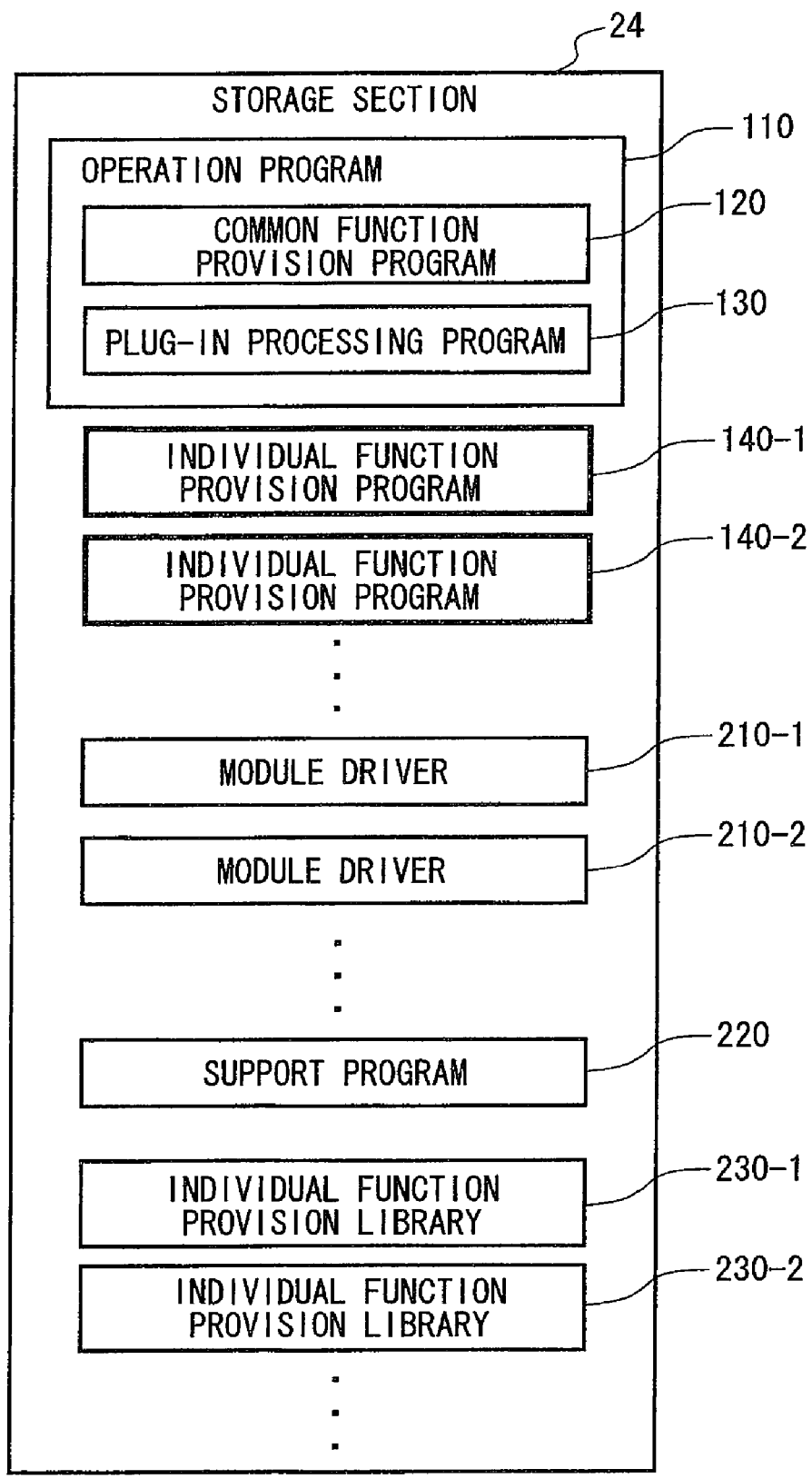
Figure 3:
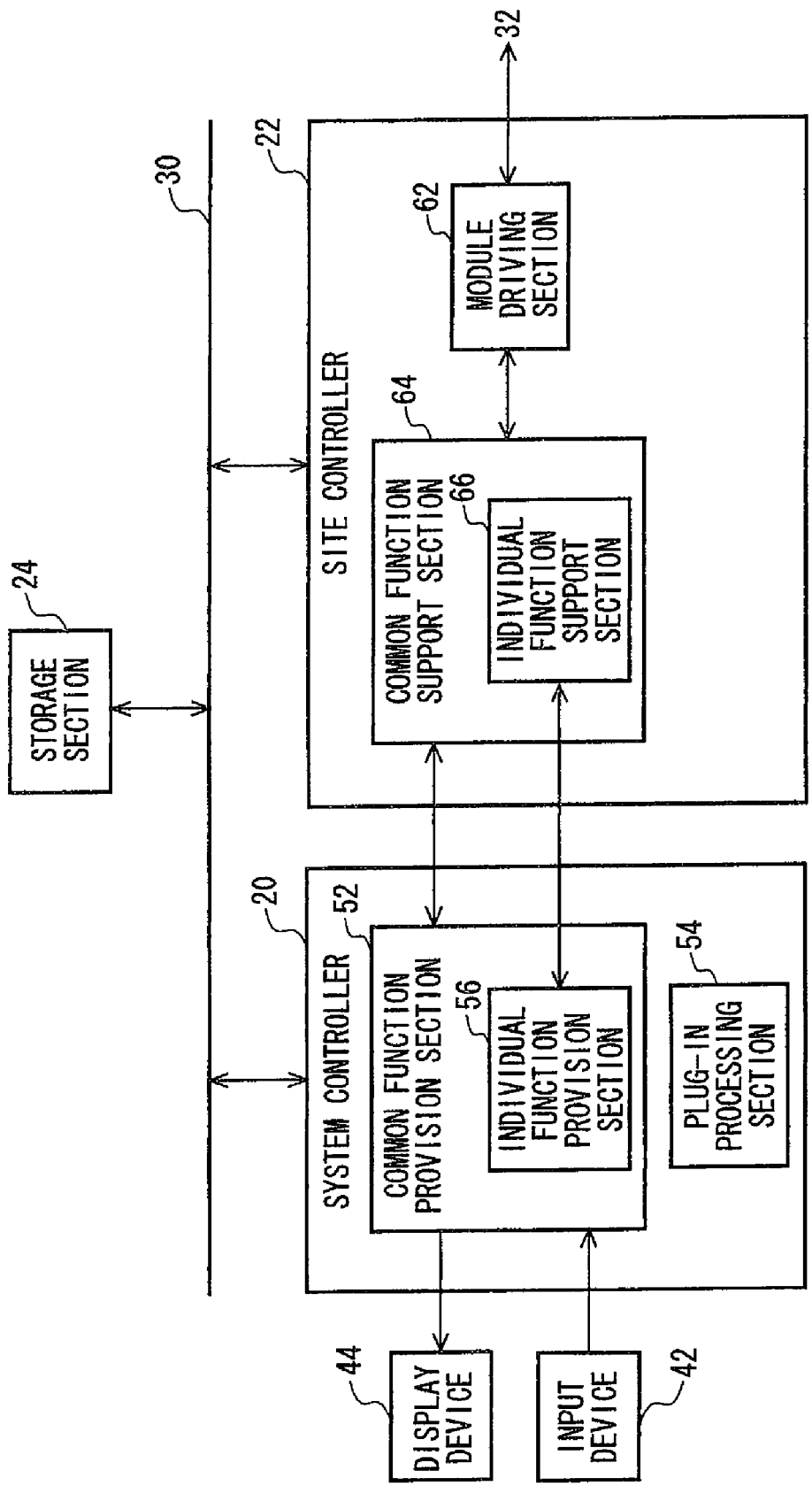

FIG. 1 shows an example of configuration of a test apparatus 10 according to an embodiment of the present invention;

FIG. 2 shows a program stored in a storage section 24 according to an embodiment of the present invention;

FIG. 3 shows functional configurations of a system controller 20 and a site controller 22 according to an embodiment of the present invention along with the storage section 24, an input device 42 and a display device 44.

Figure 4:
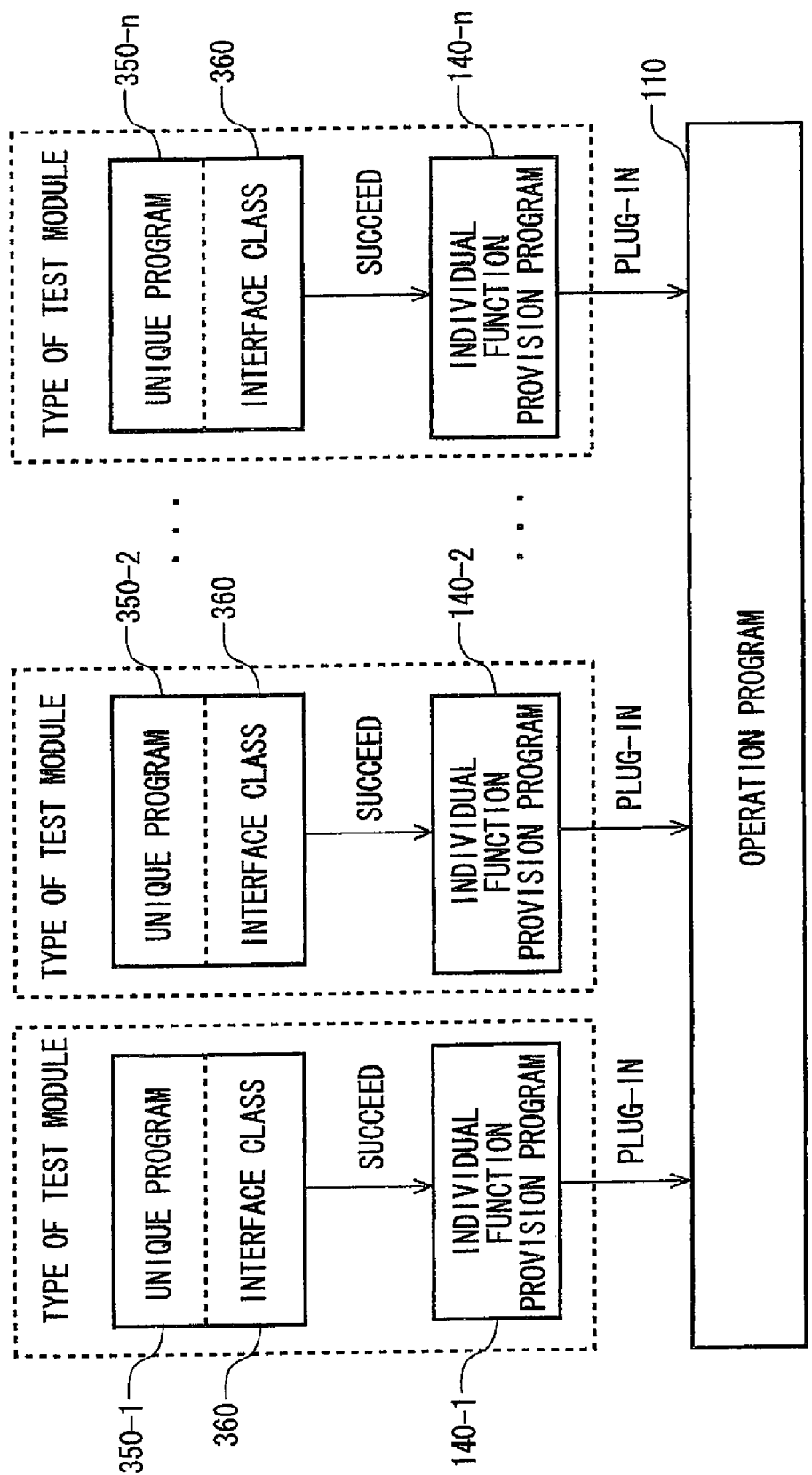
Figure 5:
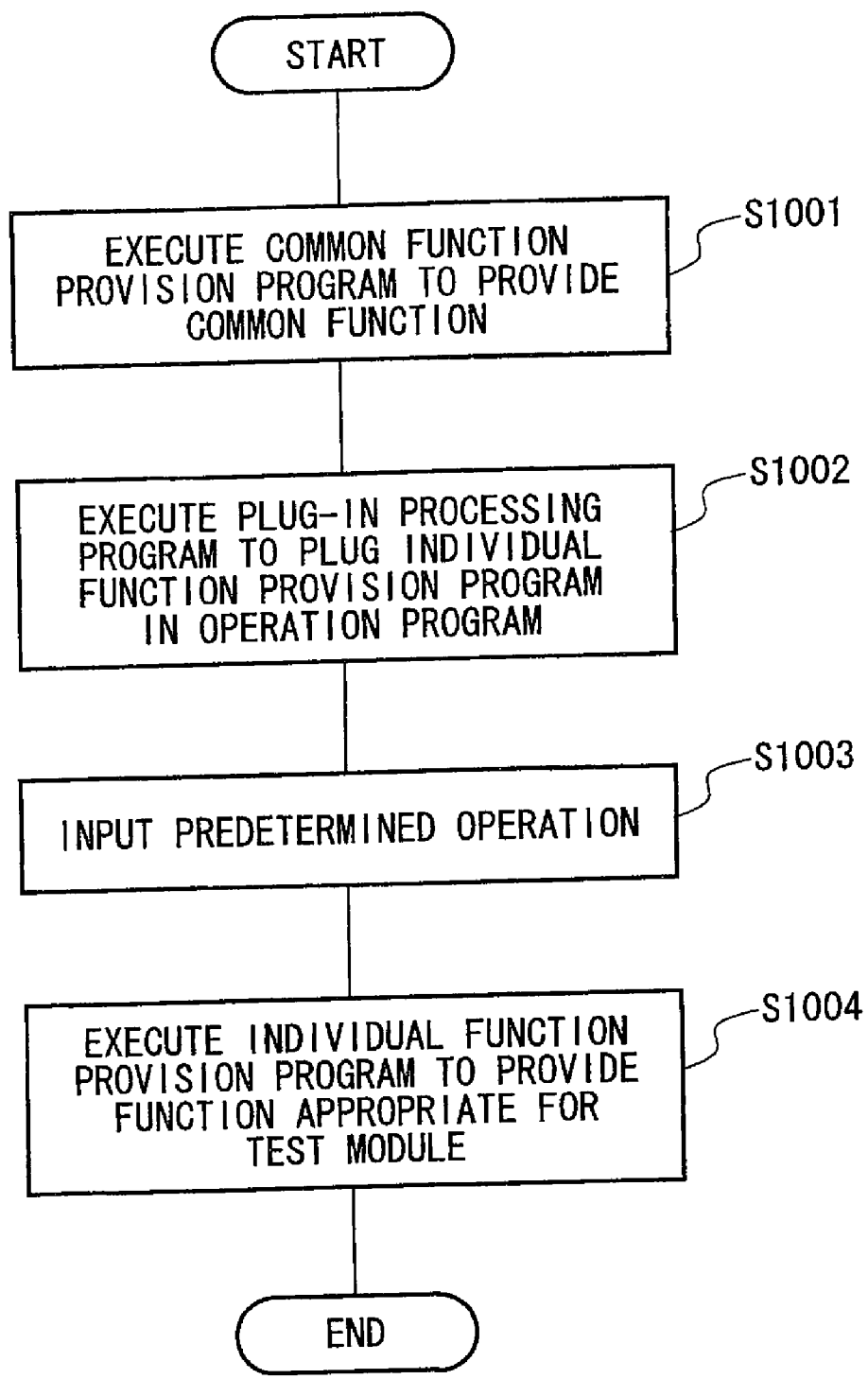
Figure 6:
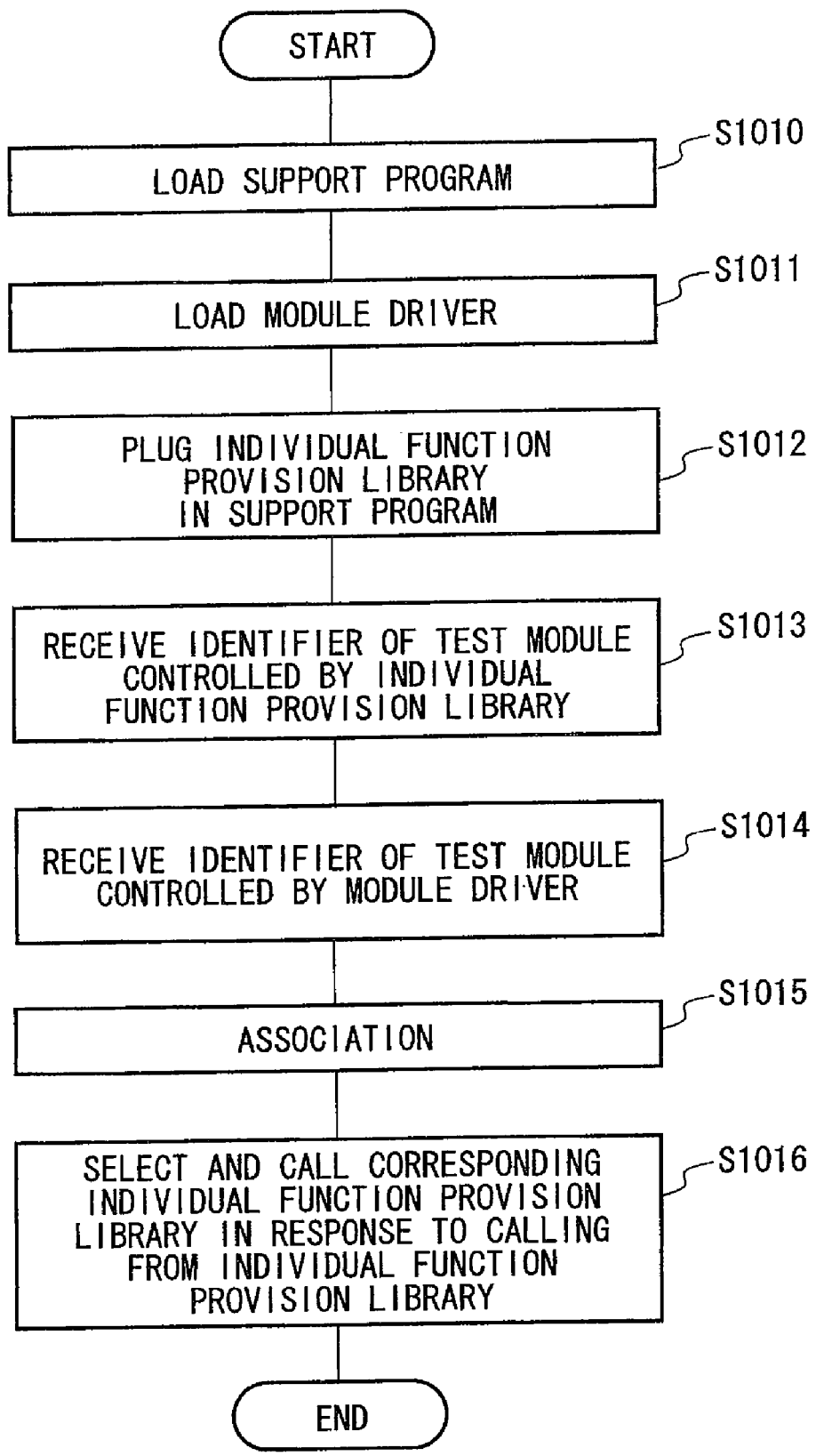
Figure 7:
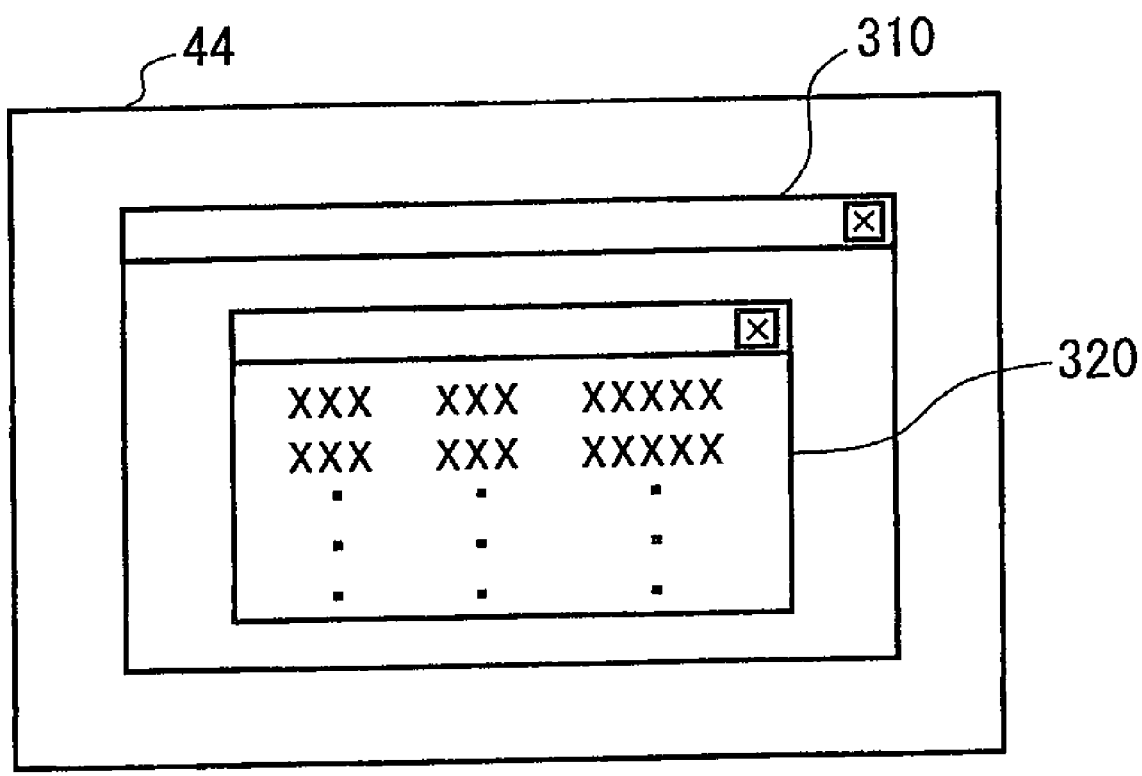
Figure 8:
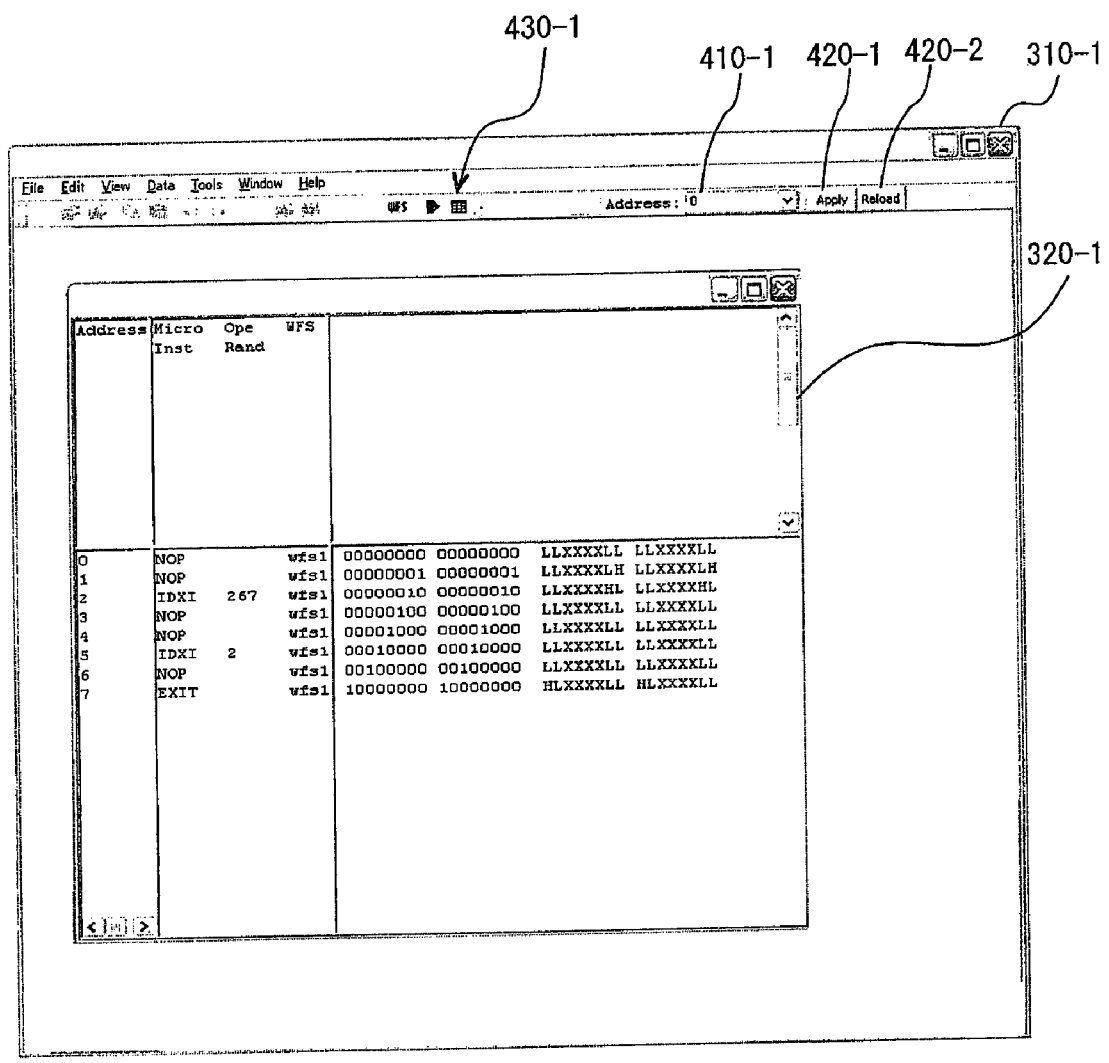
Figure 9:
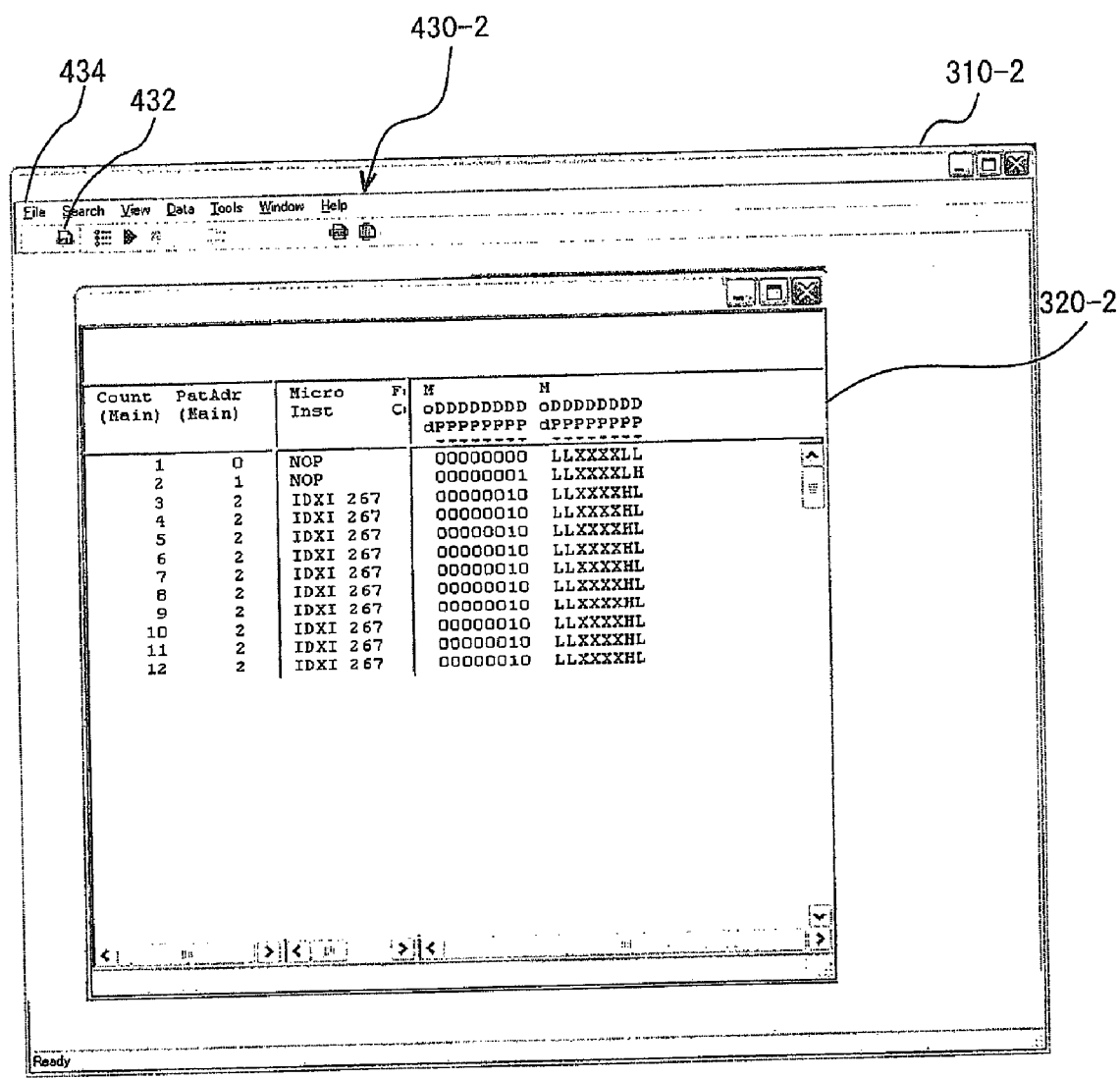
Figure 10:
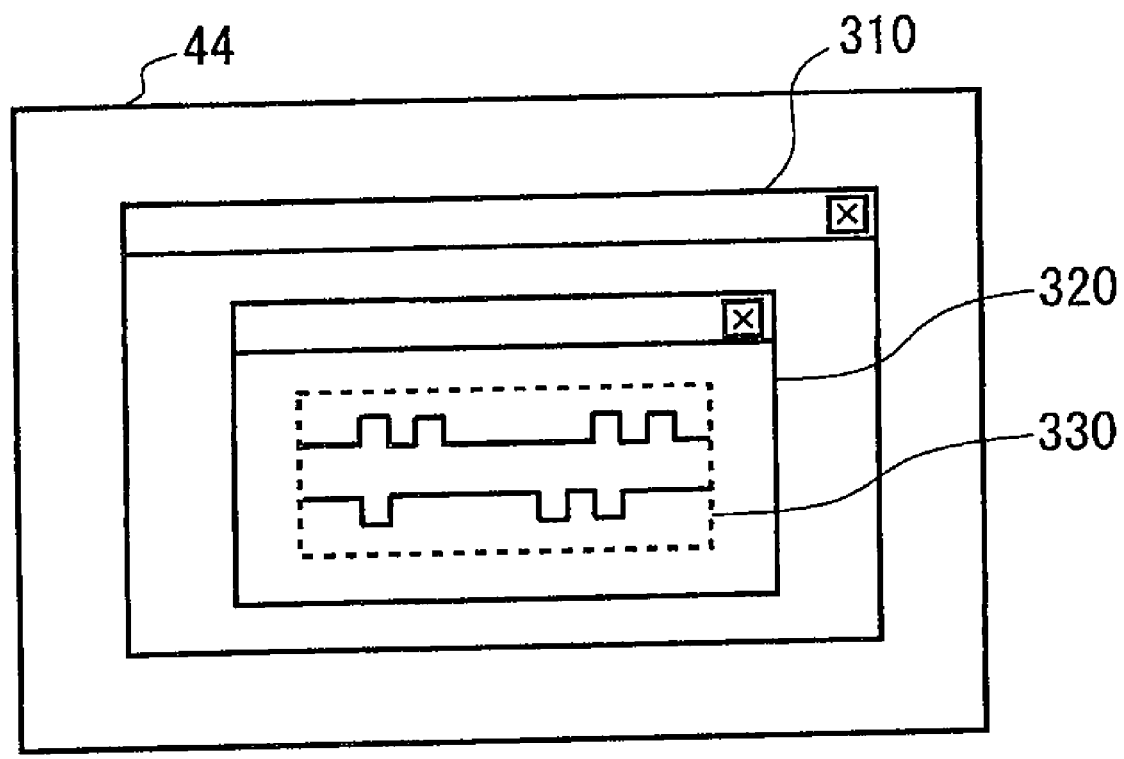
Figure 11:
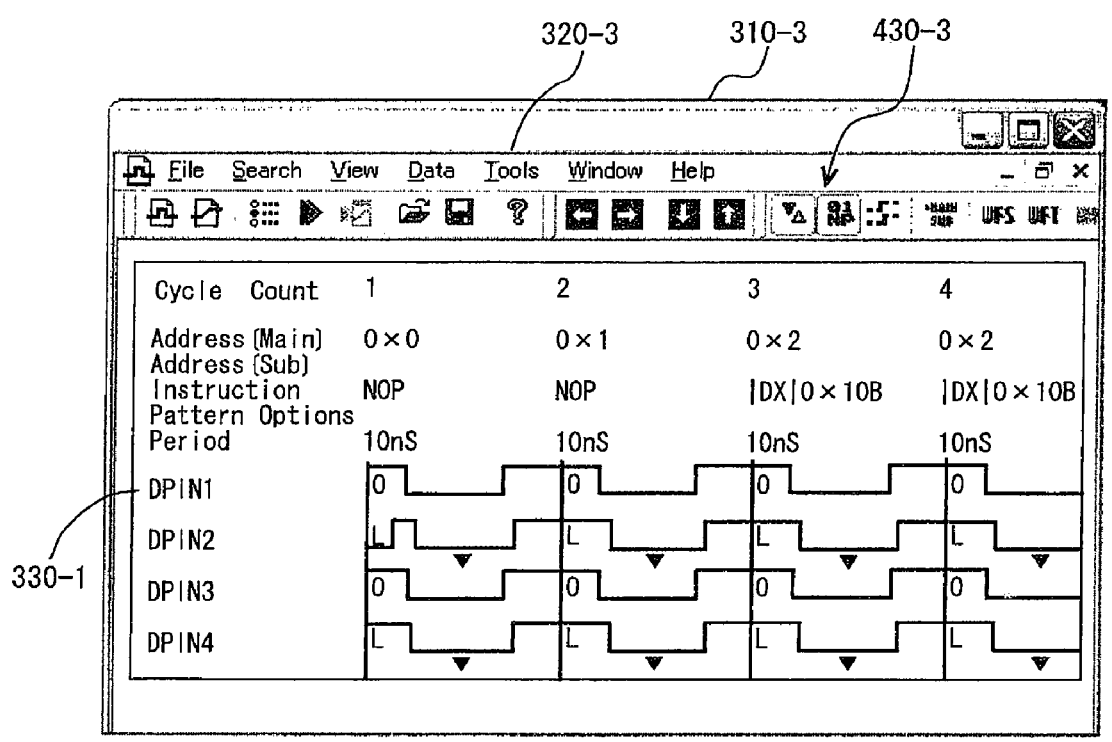
Figure 12:
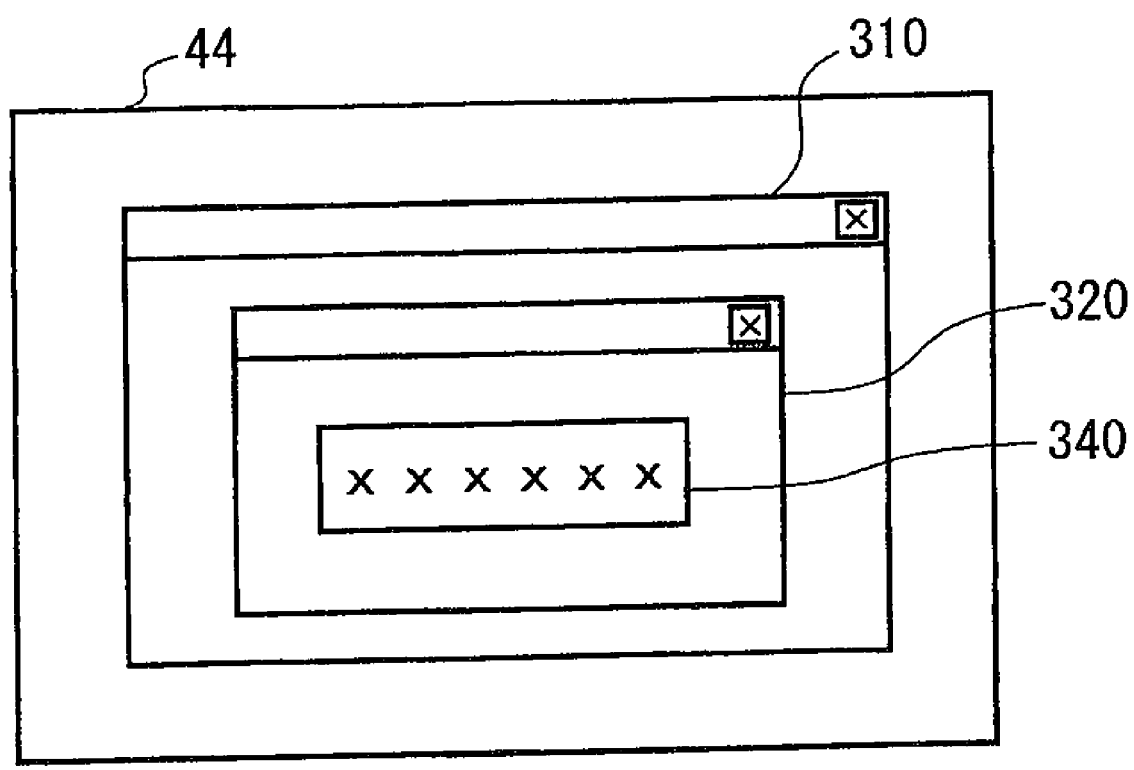
Figure 13:
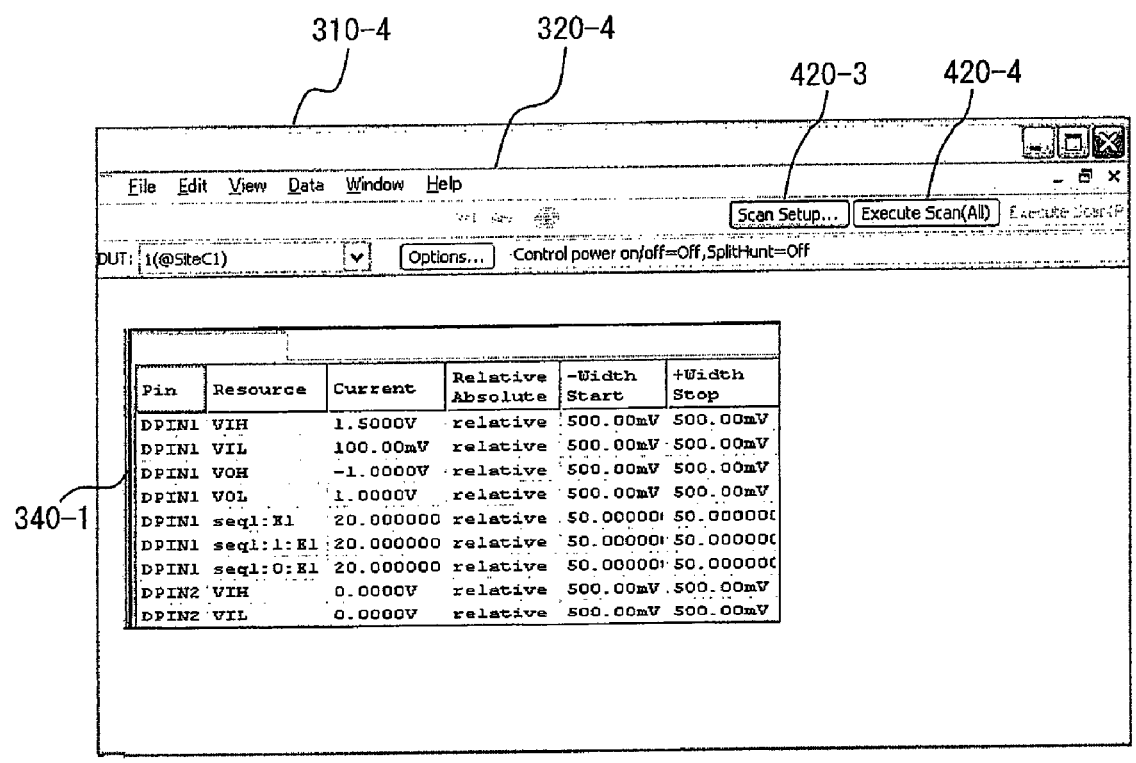
Figure 14:
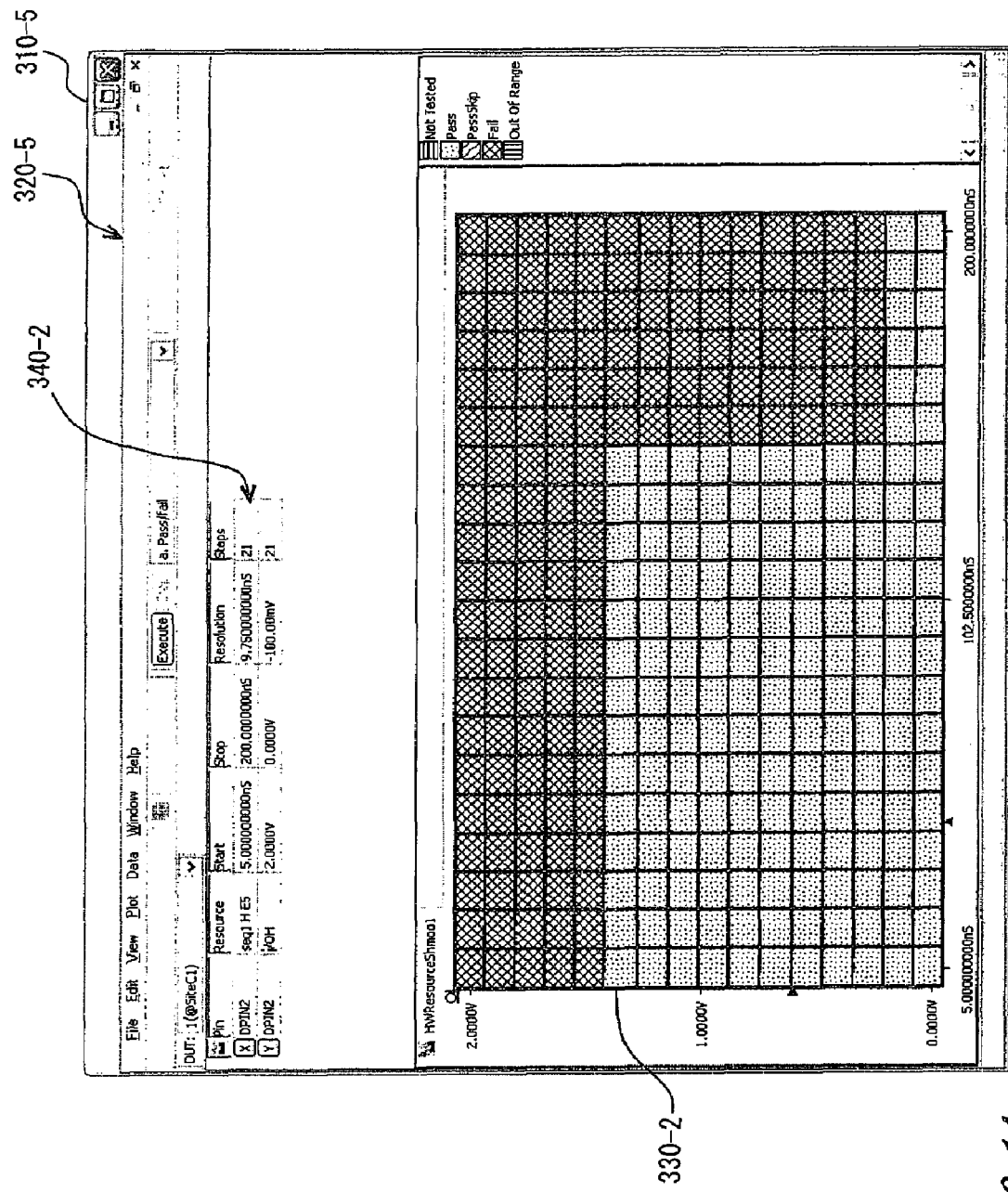
Figure 15:
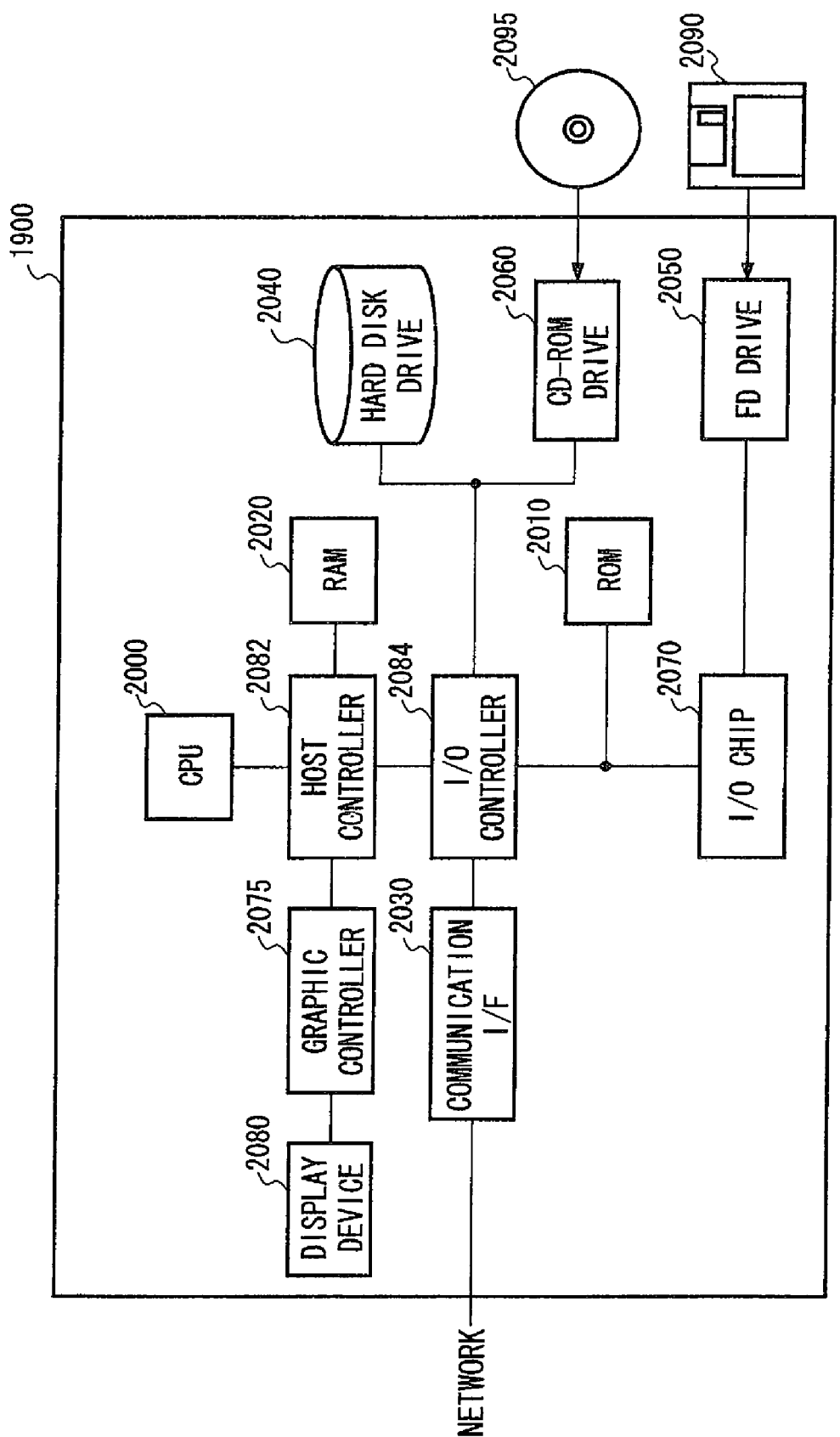

FIG. 4 shows a module configuration of individual function provision programs 140 and programs 350 unique to each type of test modules 32 according to an embodiment of the present invention;

FIG. 5 shows a processing flow of the system controller 20;

FIG. 6 shows a processing flow of the site controller 22;

FIG. 7 shows a first example of a GUI displayed on the display device 44 according to an embodiment of the present invention;

FIG. 8 shows a first display example of a window 310 and a sub-window 320 of FIG. 7;

FIG. 9 shows a second display example of the window 310 and the sub-window 320 of FIG. 7;

FIG. 10 shows a second example of the GUI displayed on the display device 44 according to an embodiment of the present invention;

FIG. 11 shows a display example of a graphic region 330 of FIG. 10;

FIG. 12 shows a third example of the GUI displayed on the display device 44 according to an embodiment of the present invention;

FIG. 13 shows a display example of a text region 340 of FIG. 12;

FIG. 14 shows a display example of the graphic region 330 of FIG. 10 and the text region 340 of FIG. 12; and FIG. 15 shows an example of hardware configuration of a computer 1900 according to an embodiment of the present invention.

DESCRIPTION OF EXEMPLARY EMBODIMENTS

The invention will now be described based on preferred embodiments, which do not intend to limit the scope of the invention, but exemplify the invention.

FIG. 1 shows an example of configuration of a test apparatus 10 according to the present embodiment. The test apparatus 10 tests devices under test 500 such as semiconductor circuits and includes a system controller 20, one or more site controllers 22 (22-1, 22-2, . . . ), a storage section 24, a test head 26 and a load board 28.

The system controller 20 controls the test apparatus 10. The system controller 20 acquires a program stored in the storage section 24 through such as a bus 30. Then, the system controller 20 executes the acquired program to control the test apparatus 10.

Each site controller 22 is arranged corresponding to the DUT 500 and controls to test the corresponding DUT 500. Each site controller 22 acquires the program from the storage section 24 through such as the bus 30. Then, each site controller 22 executes the acquired program to control to test the corresponding DUT 500. For example, each site controller 22 stores pattern data indicative of the test pattern of a test signal to be provided to the corresponding DUT 500 on the corresponding test module 32 mounted in the test head 26.

The storage section 24 stores a program for the test apparatus 10 which is executed by the system controller 20 and the site controllers 22. The storage section 24 is connected to the system controller 20 and the site controllers 22 through the bus 30. For example, the storage section 24 may be provided on the outside of the test apparatus 10. In this case, the storage section 24 is connected to the test apparatus 10 through a network. In addition, the storage section 24 may be provided inside the system controller 20 or the site controller 22, for example.

The test head 26 has one or more test modules 32. Each of the test modules 32 is connected to the slot 32 provided inside the test head 26 so as to be mounted on the test head 26, for example. Each of the test modules 32 is arranged corresponding to any DUT 500. Each of the test modules 32 is connected to the corresponding site controller 22. Each of the test modules 32 stores pattern data provided from the corresponding site controller 22.

Each of the test modules 32 generates a test signal having a waveform corresponding to the pattern data stored therein and provides the generated signal to the corresponding pin of the corresponding DUT 500. In addition, each of the test modules 32 acquires an output signal according to the provided test signal from the corresponding pin of the corresponding DUT 500. Then, each of the test modules 32 compares the acquired output signal with an expected value for the pattern data and transmits the comparison result to the corresponding site controller 22.

The load board 28 is mounted on the top of the test head 26, for example, and one or more DUTs 500 are placed on the load board 28. The load board 28 connects between the pin of each of the DUTs 500 placed thereon and the corresponding test module 32 while the load board 28 is mounted on the test head 26.

In such test apparatus 10, the type of test module 32 selected by the user can be mounted into the slot 34 at the position in the test head 26 selected by the user. That is, the test module 32 selected by the user among various test modules 32 that test the DUTs 500 can be mounted into each slot 34 in the test head 26. Thereby the test apparatus 10 can perform the type of test selected by the user on each DUT 500.

In addition, the test modules 32 mounted on the test head 26 of the test apparatus 10 may be manufactured by the manufacturer of the test apparatus 10 or may be manufactured by a third party vendor.

FIG. 2 shows a program stored in the storage section 24 according to the present embodiment. The storage section 24 stores the operation program 110 which causes the user to operate the test apparatus 10 and one or more individual function provision programs 140 (140-1, 140-2, . . . ).

The operation program 110 includes a common function provision program 120 and a plug-in processing program 130. The common function provision program 120 is executed on a controller which controls the test apparatus 10 as the system controller 20 in the present embodiment and provides the function common to each type of the test modules 32. The common function provision program 120 may be executed on the system controller 20 and provide the function common to each type of the test modules 32 through a graphical user interface (GUI), for example. The common function provision program 120 may provide to the user such as a function for setting up the test pattern and the expected value pattern common to each type of the test modules 32 and a function for displaying the test result through the GUI embodied by the system controller 20, for example.

The plug-in processing program 130 is executed on a controller as the system controller 20 in the present embodiment and plugs the individual function provision programs 140 in the operation program 110. The plug-in processing program 130 plugs the individual function provision program 140 corresponding to the test module 32 provided in the test apparatus 10 among a plurality of individual function provision programs 140 in the operation program 110, for example. The individual function provision programs 140 plugged in the operation program 110 are executed by the system controller 20 in associated with the operation program 110 (as a part of the operation program 110, for example).

Each of one or more individual function provision programs 140 is corresponding to the type of the test modules 32 which can be mounted on the test apparatus 10. Each of the individual function provision programs 140 is plugged in the operation program 110 and executed on a controller as the system controller 20 in the present embodiment to provide the function appropriate for the type of the test module 32.

Each of the individual function provision programs 140 may be executed on the system controller 20 and provide the function appropriate for the type of the test module 32 through the GUI, for example. Each of the individual function provision programs 140 may provide to the user the setup function and the display function unique to the corresponding type of the test module 32 through the GUI embodied by the system controller 20. In addition, each of the individual function provision programs 140 may provide the GUI to select the function appropriate for the type of the test module 32, for example. Specifically, each of the individual function provision programs 140 may provide the GUI such as a menu, a tool bar, a ComboBox and a tub window to select the function appropriate for the type of the test module 32.

The storage section 24 stores one or more module drivers 210 (210-1, 210-2, . . . ), a support program 220 and one or more individual function provision libraries 230 (230-1, 230-2, . . . ). Each of one or more module drivers 210 is corresponding to the type of the test module 32 which can be mounted on the test apparatus 10. Each of the module drivers 210 is executed on the site controller 22 connected to the corresponding type of the test module 32 to control the test module 32. That is, each module driver 210 is executed by the site controller 22 to causes the site controller 22 to function as a device driver that controls the corresponding test module 32.

The support program 220 is executed on the site controller 22 connected to the test module 32 and supports the function of the common function provision program 120 executed on the system controller 20. The support program 220 inputs from the system controller 20 setup data generated in accordance with the function provided by the common function provision program 120 (e.g. setup function) and provides the inputted setup data to the corresponding test module 32, for example. In addition, the support program 220 acquires a test result from the corresponding test module 32, transmits the acquired test result to the system controller 20 and presents the test result to the user through the function provided by the common function provision program 120 (e.g. display function), for example.

Each of one or more individual function provision libraries 230 is corresponding to the type of the test module 32 which can be mounted on the test apparatus 10. Each of the individual function provision libraries 230 is plugged in the support program 220 executed on the site controller 22 connected to the corresponding type of the test module 32. Each of the individual function provision libraries 230 is executed on the site controller 22 connected to the corresponding type of the test module 32 while it is plugged in the support program 220, and supports the function of the corresponding individual function provision program 140 executed on the system controller 20.

The support program 220 inputs from the system controller 20 setup data generated in accordance with the function provided from the corresponding individual function provision program 140 (e.g. setup function) and provides the inputted setup data to the corresponding test module 32, for example. In addition, the support program 220 acquires a test result from the corresponding test module 32, transmits the acquired test result to the system controller 20 and presents the test result to the user through the function provided by the corresponding individual function provision program 140 (e.g. display function), for example.

FIG. 3 shows functional configurations of the system controller 20 and the site controller 22 according to the present embodiment along with the storage section 24, an input device 42 and a display device 44. The input device 42 and the display device 44 are connected to the system controller 20, for example. The input device 42 is an interface to input information to the system controller 20 by the user. The display device 44 is an interface to display information to the user by the system controller 20. The input device 42 and the display device 44 can provide the GUI embodied by the system controller 20 to the user.

The system controller 20 loads and executes the operation program 110 stored in the storage section 24 to function as a common function provision section 52 and a plug-in processing section 54. Specifically, the system controller 20 executes the common function provision program 120 to function as a common function provision section 52 and executes the plug-in processing program 130 to function as a plug-in processing section 54.

The common function provision section 52 may provide the function common to each type of the test modules 32. The common function provision section 52 may provide the function common to each type of the test modules 32 through the GUI embodied by the input device 42 and the display device 44, for example. The common function provision section 52 may provide to the user the setup function and the display function common to each type of the test modules 32 through the GUI, for example.

The plug-in processing section 54 calls from the storage section 24 the individual function provision program 140 corresponding to the type of the test module 32 included in the test apparatus 10 and plugs the same in the operation program 110. The system controller 20 is called by the plug-in processing section 54 and executes the individual function provisional program 140 plugged in the operation program 110 to function as the individual function provisional section 56. The individual function provision section 56 provides a function appropriate for the type of the corresponding test module 32. Each of the individual function provision sections 56 may provide the function appropriate for the type of the test module 32 through the GUI embodied by the input device 42 and the display device 44, for example. Each of the individual function provision sections 56 may provide to the user the setup function and the display function unique to the corresponding type of test module 32 through the GUI, for example.

In addition, the individual function provision section 56 may provide the GUI to select the function appropriate for the type of the test module 32, for example. Specifically, each of the individual function provision programs 140 may provide the GUI such as a menu, a tool bar, a ComboBox and a tub window to select the function appropriate for the type of the test module 32.

The site controller 22 loads the module driver 210 corresponding to the test module 32 connected to the site controller 22 and executes the same to function as a module driving section 62. The module driving section 62 controls the test module 32 connected to the site controller 22. Here, when a plurality of test modules 32 are connected to the site controller 22, the site controller 22 may load a plurality of corresponding module drivers 210 and execute the same to function as the plurality of module driving sections 62.

The site controller 22 loads the support program 220 and executes the same to function as the common function support section 64. The common function support section 64 supports the function of the common function provision section 52. The common function support section 64 provides a function to input from the common function provision section 52 setup data generated in accordance with the function provided by the common function provision section 52 (e.g. setup function) and provide the inputted setup data to the corresponding test module 32 through the module drive section 62, for example. In addition, the common function support section 64 acquires a test result from the corresponding test module 32 through the module driving section 62, transmits the acquired test result to the common function provision section 52 and presents the test result to the user through the function provided by the common function provision section 52 (e.g. display function), for example. Here, when the plurality of test modules 32 are connected to the site controller 22, the site controller 22 may load a plurality of corresponding support programs 220 and executes the same to function as a plurality of common function support sections 64.

Each of the site controllers 22 calls the individual function provision library 230 corresponding to the test module 32 connected to the site controller 22 and plugs the same in the support program 220. The site controller 22 executes the individual function provision library 230 plugged in the support program 220 to function as the individual function support section 66. The individual function support section 66 supports the function of the individual function provision section 56 corresponding to the test module 32 connected to the site controller 22. The individual function support section 66 provides a function to input from the individual function provision section 56 setup data generated in accordance with the function provided by the individual function provision section 56 (e.g. setup function) and provide the inputted setup data to the corresponding test module 32 through the module driving section 62, for example. In addition, the individual function support section 66 acquires a test result from the corresponding test module 32 through the module driving section 62, transmits the acquired test result to the individual function provision section 56 and presents the test result to the user through the function provided by the individual function provision section 56, for example.

The system controller 20 and the site controller 22 described above can reduce the burden on the user to operate the function appropriate for each type of the test modules 32. With respect to the system controller 20 and the site controller 22, even if the operation program for each vendor which is different from each other is provided to the user, the user need not select to use each operation program, for example.

FIG. 4 shows a module configuration of individual function provision programs 140 and programs 350 unique to each type of the test modules 32 according to the present embodiment. When two or more individual function provision programs 140 with the functions different from each other are provided to each type of the test modules 32, the controller as the system controller 20 in the present embodiment provides an interface class 360 to manage the test modules 32 which is used together by two or more individual function provision programs having the functions different from each other together. Each interface class 360 is implemented to a program 350 unique to the test module 32 that controls according to the type of the test module 32.

Then, each of the individual function provision programs 140 succeeds to the interface class 360. As described above, the common interface class 360 is implemented in the program 350 unique to each type of the test modules 32. Therefore, the system controller 20 can assure to transmit/receive data between the function block embodied by executing each individual function provision program 140 and the function block embodied by executing each unique program 350.

FIG. 5 shows a processing flow of the system controller 20. In executing the operation program 110 to cause the user to operate the test apparatus 10, the system controller 20 firstly executes the common function provision program 120 included in the operation program 110 and provides the function common to each type of the test modules 32 (S1001). Next, the system controller 20 executes the plug-in processing program 130 included in the operation program 110 to plug the individual function provision program 140 into the operation program 110 (S1002).

Next, the system controller 20 calls the individual function provision program 140 in response to the input of a predetermined operation to select the function appropriate for the type of the test module 32 (S1003). Next, the system controller 20 executes the individual function provision program 140 in response to that the individual function provision program 140 is called from the operation program 110 in S1003 and provides the function appropriate for the test module 32 corresponding to the individual function provision program 140 (S1004). Thereby the system controller 20 can execute the operation program 110 into which the individual function provision program 140 is plugged to execute the functions provided by the common function provision program 120 and the individual function provision program 140.

FIG. 6 shows a processing flow of the site controller 22. Firstly, each of the site controllers 22 reads the support program 220 that supports the operation program 110 from the storage section 24, loads and executes the same (S1010). Next, the site controller 22 reads the module driver 210 that controls each of a plurality of test modules 32 from the storage section 24 in association with each of the plurality of the test modules 32, loads and executes the same (S1011).

Next, the site controller 22 plugs in the support program 220 the individual function provision library 230 provided corresponding to each of the plurality of individual function provision programs 140 that controls the test module 32 through the module driver 210 corresponding to the test module 32 (S1012).

Next, the site controller 22 calls each of the plurality of plugged-in individual function provision libraries 230 and executes the same. Here, the unique identifier is allocated to each of the plurality of test modules 32 which can be mounted on the test apparatus 10. Each of the module drivers 210 and the individual function provision libraries 230 stores therein the identifier of the corresponding test module 32. The site controller 22 receives the identifier of the test module 32 controlled by the each of the individual function provision libraries 230 (S1013).

Next, the site controller 22 calls each of the plurality module drivers 210 and receives the identifier of the test module 32 controlled by the each of the module drivers 210 (S1014). Next, the site controller 22 associates each of the test modules 32 with the individual function provision library 230 which provides the function appropriate for the test module 32 under the condition that the module driver 210 which controls each of the test modules 32 is corresponding to the identifier received from the individual function provision library 230 (S1015).

Next, accessing data of the test module 32 or controlling the same, the individual function provision program 140 executed by the system controller 20 designates the identifier of the test module 32 and calls the support program 220 executed on the site controller 22. Designating the identifier from the individual function provision program 140 and receiving a call, the site controller 22 selects the individual function provision library 230 associated with the test module 32 corresponding to the designated identifier and calls the same (S1016). Thereby the site controller 22 can plug each individual function provision library 230 into the support program 220 to support the functions provided by the common function provision program 120 and the individual function provision program 140.

FIG. 7 shows a first example of a GUI displayed on the display device 44 according to the present embodiment. In the first example, the common function provision program 120 included in the operation program 110 is executed by the system controller 20 to cause the function common to each type of the test modules 32 (e.g. a setup function and a display function) to be displayed on an window 310 embodied by the GUI.

Further, each individual function provision program 140 plugged in the operation program 110 is executed by the system controller 20 to cause a sub-window 320 of the window 310 to be displayed in the present embodiment. The sub-window 320 provides the function appropriate for the type of the test module 32 mounted on the test apparatus 10 (e.g. a setup function and a display function) by the GUI. The individual function provision program 140 displays data provided to the test module 32 or data acquired from the test module 32 on the sub-window 320.

FIG. 8 shows a first display example of the window 310 and the sub-window 320 of FIG. 7. A first window 310-1 displays thereon a ComboBox 410-1 a button 420-1 and 420-2 and an operating icon 430-1 to perform the common operation on a plurality of test modules 32, for example.

Further, a first sub-window 320-1 corresponding to a predetermined test module 32 mounted on the test apparatus 10 is displayed within the first window 310-1. The first sub-window 320-1 displays thereon a test pattern to be provided from the corresponding test module 32 to the DUT 500. Specifically, the first sub-window 320-1 displays such as an instruction sequence and pattern data indicative of the test pattern.

Moreover, the user may edit the test pattern on such as the first sub-window 320-1 by using the input device 42 and the display device 44. Finishing editing the first sub-window 320-1, the individual function provision program 140 calls the corresponding individual function provision library 230 executed by the site controller 22 and stores the edited test pattern on the corresponding test module 32.

FIG. 9 shows a second display example of the window 310 and the sub-window 320 of FIG. 7. A second window 310-2 displays thereon an operating icon 430-2 to execute the common operation on the plurality of test modules 32, for example.

Then, a second sub-window 320-2 is displayed within the second window 310-2. The second sub-window 320-2 displays thereon an expected value pattern indicative of the expected value to be fulfilled by an output signal of the DUT 500 for the corresponding test module 32. Specifically, the second sub-window 320-2 displays thereon the instruction sequence and pattern data indicative of the expected value pattern.

Moreover, the user may edit the expected value pattern on such second sub-window 320-2 by using the input device 42 and the display device 44. Finishing editing the second sub-window 320-2, the individual function provision program 140 calls the corresponding individual function provision library 230 executed by the site controller 22 and stores the edited expected value pattern on the corresponding test module 32.

The individual function provision program 140 plugged in the operating program 110 may display an window display icon 432 to display the second sub-window 320-2 on the second window 310-2, for example. The individual function provision program 140 calls the second sub-window 320-2 and displays the same provided that the window display icon 432 is clicked by the user. In addition, the individual function provision program 140 may display a menu to display the second sub-window 320-2 by the menu bar 434 on the second window 310-2, for example.

FIG. 10 shows a second example of the GUI displayed on the display device 44 according to the present embodiment. In the second example, the common function provision program 120 displays an window 310. In addition, the individual function provision program 140 plugged in the operation program 110 is executed by the system controller 20 to display a sub-window 320 including a graphic region 330 in the present embodiment. The individual function provision program 140 graphically displays data provided to the test module 32 or data acquired from the test module 32 on the graphic region 330. The individual function provision program 140 may acquire an output signal of the DUT 500 from the test module 32 and display the waveform of the output signal on the graphic region 330, for example.

FIG. 11 shows a display example of a graphic region 330 of FIG. 10. A third sub-window 320-3 displayed within a third window 310-3 displays the waveform of an output signal of the DUT 500 within a first graphic region 330-1. The third sub-window 320-3 may display a simple waveform indicative of a voltage level to a time, or may display the other waveform. The individual function provision program 140 plugged in the operation program 110 may display an operating icon 430-3 to display a dialog for setting such as the sampling period of the waveform displayed on the first graphic region 330-1, for example.

FIG. 12 shows a third example of the GUI displayed on the display device 44 according to the present embodiment. In the third example, the common function provision program 120 displays the window 310. In addition, the common function provision program 120 displays a sub-window 320 including a text region 340 in the present embodiment.

Here, any individual function provision program 140 may not be plugged in the operation program 110 in the present example. In this case, the common function provision program 120 may display data provided to the test module 32 or data acquired from the test module 32 within the text region 340 on behalf of the individual function provision program 140. Thereby the operation program 110 can not display the GUI as the case that each individual function provision program 140 is plugged therein, but can at least display text data.

FIG. 13 shows a display example of a text region 340 of FIG. 12. A fourth sub-window 320-4 displayed within a fourth window 310-4 includes a first text region 340 for which the margin of the DUT 500 is displayed. For example, the first text region 340 displays data indicative of a switching point between pass/fail, or a distance between the switching points by text, for each operating pin of the DUT 500.

FIG. 14 shows a display example of the graphic region 330 of FIG. 10 and the text region 340 of FIG. 12. A fifth sub-window 320-5 displayed within a fifth window 310-5 may include a second graphic region 330-2 in which a Shmoo waveform obtained by plotting the test result for each condition of the test signal of the DUT 500 is displayed, and a second text region 340-2 in which the operating condition of the DUT 500 is displayed. The Shmoo waveform is a waveform obtained by plotting the test results of the DUT 500 in the region whose horizontal axis is the phase or the time and whose vertical axis is the voltage of the test signal, for example.

FIG. 15 shows an example of hardware configuration of a computer 1900 according to the present embodiment. The computer 1900 according to the present embodiment includes a CPU periphery having a CPU 2000, a RAM 2020, a graphic controller 2075 and a display device 2080 which are connected to each other through a host controller 2082, an input/output unit having a communication interface 2030, a hard disk drive 2040 and a CD-ROM drive 2060 which are connected to the host controller 2082 through an input/output controller 2084 and a legacy input/output unit having a ROM 2010, a flexible disk drive 2050 and an input/output chip 2070 which are connected to the input/output controller 2084.

The host controller 2082 connects the RAM 2020 to the CPU 2000 and the graphic controller 2075 which access the RAM 2020 with a high transfer rate. The CPU 2000 operates according to the programs stored in the ROM 2010 and the RAM 2020 to control each unit. The graphic controller 2075 obtains image data generated on a frame buffer provided in the RAM 2020 by such as the CPU 2000 and displays the same on the display device 2080. Alternatively, the graphic controller 2075 may include therein a frame buffer for storing image data generated by such as the CPU 2000.

The input/output controller 2084 connects the host controller 2082 to the communication interface 2030, the hard disk drive 2040, and the CD-ROM drive 2060 which are relatively high-speed input/output units. The communication interface 2030 communicates with the other units through a network.

The hard disk drive 2040 stores the program and the data used by the CPU 2000 in the computer 1900. The CD-ROM drive 2060 reads the program or data from the CD-ROM 2095 and provides the same to the hard disk drive 2040 through the RAM 2020.

The ROM 2010, the flexible disk drive 2050 and the input/output chip 2070 which are relatively low-speed input/output units are connected to the input/output controller 2084. The ROM 2010 stores a boot program executed by the computer 1900 at activating and a program depending on the hardware of the computer 1900 and so forth. The flexible disk drive 2050 reads the programs or data from a flexible disk 2090 and provides the same to the hard disk drive 2040 through the RAM 2020. The input/output chip 2070 connects various input/output units through the flexible disk drive 2050 and such as a parallel port, a serial port, a keyboard port and a mouse port.

The program provided to the hard disk drive 2040 through the RAM 2020 is stored in a recording medium, such as the flexible disk 2090, the CD-ROM 2095, or an IC card and provided by the user. The program is read from the recording medium, installed on the hard disk drive 2040 in the computer 1900 through the RAM 2020 and executed by the CPU 2000.

The computer 1900 having the above-described configuration functions as the system controller 20 and the site controllers 22 in the test apparatus 10.

The program which is installed on the computer 1900 and causes the computer 1900 to function as the system controller 20 includes the operation program 110 and one or more individual function provision programs 140. Meanwhile, the program which is installed on the computer 1900 and causes the computer 1900 to function as the site controllers 22 includes one or more module drivers 210, the support program 220 and one or more support programs 220. Those programs or modules cause such as the CPU 2000 to function the computer 1900 as the system controller 20 and the site controllers 22, respectively.

The above-described programs or modules may be stored in an external storage medium. The recording medium may be, in addition to the flexible disk 2090 and the CD-ROM 2095, an optical storage medium such as a DVD and a CD, a magneto-optical recording medium such as a MO, a tape medium and a semiconductor memory such as an IC card. Moreover, a storage device such as a hard disk or a RAM which is provided in the server system connected to a private communication network or Internet may be used as the recording medium to provide the program to the computer 1900 through the network.

While the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A recording medium recording thereon a program for a test apparatus including test modules that test devices under test, the program including:
    a first instruction that causes a controller for controlling the test apparatus to execute a common function provision program that provides a function common to each type of the test modules; and
    a second instruction that causes the controller to plug in an individual function provision program for providing a function appropriate for the type of each of the test modules,
    wherein
        the controller provides the function common to each type of the test modules through a graphical user interface (GUI) by executing the common function provision program,
        the controller provides a function appropriate for the type of the test module through the GUI by executing the individual function provision program, and
        the controller causes a sub-window of a window displayed by the common function provision program to graphically display data provided to the test module or data acquired from the test module by executing the individual function provision program.

2. The recording medium as set forth in claim 1, wherein the controller executes the individual function provision program to provide a GUI to select the function appropriate for the type of the test module.

3. The recording medium as set forth in claim 1, wherein the controller executes the program and provides a function to display or edit at least one of a test pattern which should be provided from the test apparatus to the device under test and an expected value pattern indicative of an expected value which should be fulfilled by an output signal of the device under test.

4. The recording medium as set forth in claim 1, wherein the controller executes the program and provides a function to acquire the output signal of the device under test from the test module and display a waveform of the output signal.

5. The recording medium as set forth in claim 1, wherein the controller executes the program and provides a function to display the operating margin of the device under test.

6. The recording medium as set forth in claim 1, wherein the controller executes the program and provides a function to display a Shmoo waveform obtained by plotting the test result for each condition of a test signal of the device under test.

7. A recording medium recording thereon a program for a test apparatus including test modules that test devices under test, the program including:
    a first instruction that causes a controller for controlling the test apparatus to execute a common function provision program that provides a function common to each type of the test modules; and
    a second instruction that causes the controller to plug in an individual function provision program for providing a function appropriate for the type of each of the test modules,
    wherein
        the controller provides the function common to each type of the test modules through a graphical user interface (GUI) by executing the common function provision program,
        the controller provides a function appropriate for the type of the test module through the GUI by executing the individual function provision program, and
        the controller causes a window displayed by the common function provision program to graphically display data provided to the test module or data acquired from the test module by executing the individual function provision program.

8. The recording medium as set forth in claim 7, wherein the controller executes the individual function provision program to provide a GUI to select the function appropriate for the type of the test module.

9. The recording medium as set forth in claim 7, wherein the controller executes the program and provides a function to display or edit at least one of a test pattern which should be provided from the test apparatus to the device under test and an expected value pattern indicative of an expected value which should be fulfilled by an output signal of the device under test.

10. The recording medium as set forth in claim 7, wherein the controller executes the program and provides a function to acquire the output signal of the device under test from the test module and display a waveform of the output signal.

11. The recording medium as set forth in claim 7, wherein the controller executes the program and provides a function to display the operating margin of the device under test.

12. The recording medium as set forth in claim 7, wherein the controller executes the program and provides a function to display a Shmoo waveform obtained by plotting the test result for each condition of a test signal of the device under test.

13. A test apparatus that tests devices under test, comprising:
a controller that executes a program which enables a user to operate the test apparatus and controls the test apparatus; and
a plurality of slots into which each test module selected among various test modules that test the devices under test by a user can be mounted,
wherein
the controller executes a common function provision program included in the program to provide a function common to each type of the test modules;
the controller executes a plug-in processing program included in the program to plug in the program an individual function provision program which provides a function appropriate for the type of each of the test module, and
the controller executes the individual function provision program in response to the fact that the individual function provision program is called from the program to provide a function appropriate for the test module corresponding to the individual function provision program.

14. The test apparatus as set forth in claim 13, wherein the controller executes the common function provision program to provide the function common to each type of the test modules through a graphical user interface (GUI), and executes the individual function provision program to provide the function appropriate for the type of the corresponding test module through the GUI.

15. The test apparatus as set forth in claim 13, wherein
two or more individual function provision programs having the functions different from each other is provided for each type of the test modules,
the controller provides an interface class to manage the test modules which is utilized together by the two or more individual function provision programs having the functions different from each other,
the interface class is implemented by a program unique to the test module which performs a control appropriate for the type of the test module, and
each of the individual function provision programs inherit the interface class.

16. The test apparatus as set forth in claim 13, wherein
the plurality of test modules selected by the user can be mounted on the test apparatus,
the controller includes a system controller that controls the test apparatus and a site controller provided corresponding to the device under test that controls to test the corresponding device under test,
the system controller executes the program and the individual function provision program, and
the site controller performs:
to load and execute a module driver corresponding to each of the plurality of test modules that controls the test module;
to plug an individual function provision library provided corresponding to each of the plurality of individual function provision programs that controls the test module through the module driver corresponding to the test module in a support program which is executed on the site controller to support the program;
to call and execute each of the plurality of plugged-in individual function provision libraries, and receive an identifier of the test module controlled by each of the individual function provision libraries;
to call each of the plurality of module drivers and receive the identifier of the test module controlled by each of the module drivers; and
to associate each of the test modules with the individual function provision library which provides the function appropriate for the test module provided that the module driver which controls each of the test modules is corresponding to the identifier received from the individual function provision library.

* * * * *